March 11, 1958     A. A. FAYERS ET AL     2,825,977
MAGNETOMETER COMPASS
Filed Feb. 11, 1953

United States Patent Office 2,825,977
Patented Mar. 11, 1958

2,825,977

MAGNETOMETER COMPASS

Alfred Ayton Fayers, Fleet, England, and Benjamin George Gates, Menton, Melbourne, Victoria, Australia, assignors to Minister of Supply in Her Majesty's Government of the United Kingdom of Great Britain and Northern Ireland, London, England Application February 11, 1953, Serial No. 336,234

7 Claims. (Cl. 33—204)

This invention relates to magnetic compasses.

According to the present invention a compass magnetometer or the like comprises a coil wound about a core of which the permeability varies sufficiently with applied magnetic field strength to produce appreciable change in the self-inductance of the coil when the orientation of the coil relative to a magnetic field to be measured is changed. The coil may form part of the tuned circuit of an oscillator so that the frequency of oscillation of the oscillator changes with variation in the orientation of the coil relative to the magnetic field. The frequency of oscillation of the oscillator may thus be used to provide an indication of the strength of the magnetic field to be measured. Alternatively the coil may be incorporated in one arm of an alternating current bridge circuit.

A constant biassing field may be applied to the core of the coil by means of a permanent magnet. In this manner, a suitable value of the permeability of the core may be chosen about which it is convenient to vary the permeability by means of the magnetic field to be measured. The invention may also be applied to a compass in a manner to be explained hereinafter.

Figure 1:
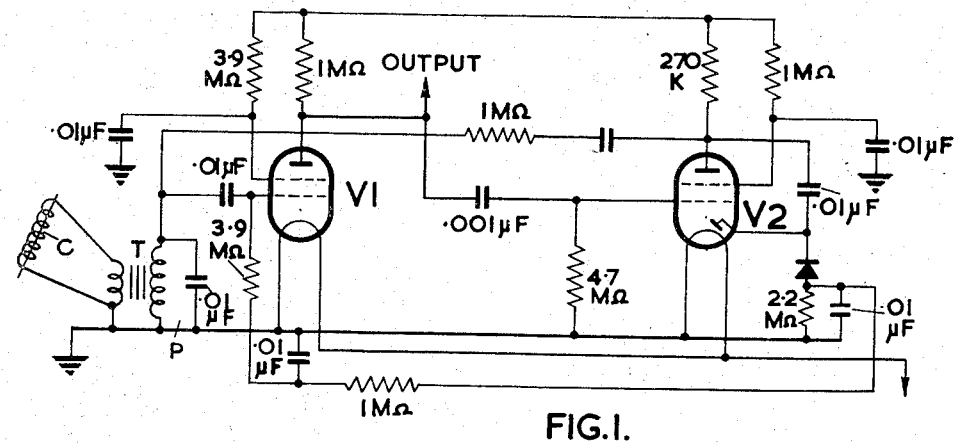
Figure 2:
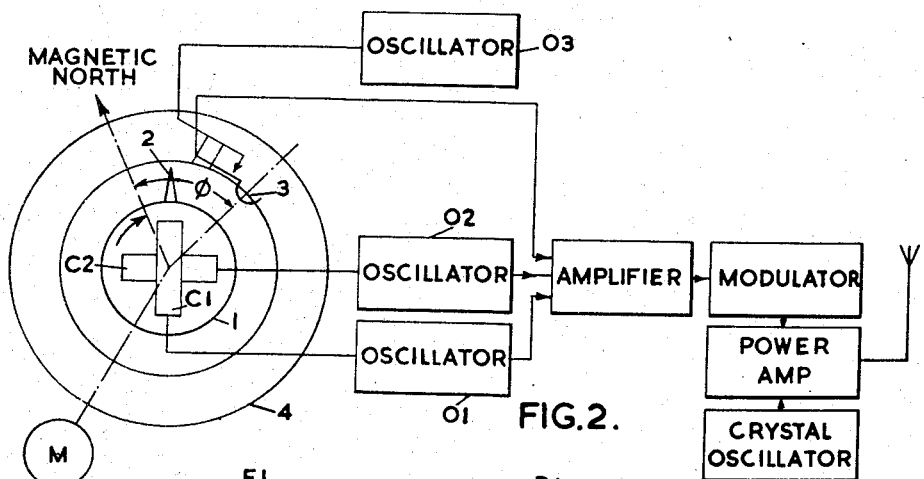
Figure 3:
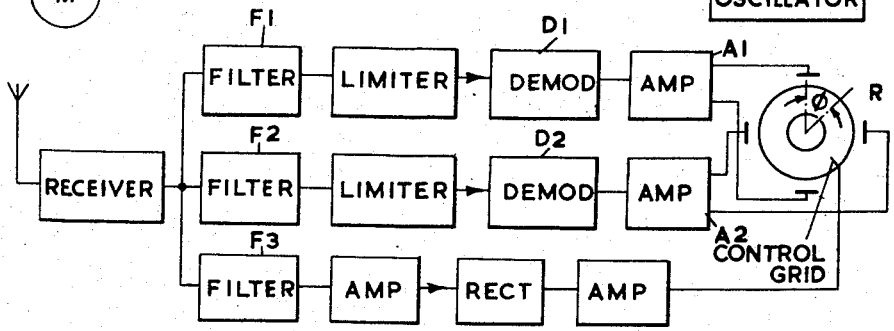

Embodiments of the invention will now be described, by way of example, with reference to the accompanying drawings, of which Fig. 1 shows one embodiment of the invention Fig. 2 shows the invention applied to a remote reading compass and Fig. 3 shows a receiving and indicating arrangement to be used with the arrangement shown in Fig. 2.

In Fig. 1 there is shown a coil C coupled to a transformer T forming part of a tuned circuit P in an oscillator comprising the retroactively coupled valves V1 and V2.

The coil C is wound on a mu-metal core and has a permanent magnet associated with it to produce a biassing magnetic field in the core so that the permeability of the core decreases with increase of magnetic field strength at values of field strength lying within the probable limits of variation of the magnetic field strength to be measured. These limits may, for instance, be the limits within which the magnetic field along the axis of the coil varies when the coil is rotated through an angle of 360 degrees within a magnetic field of given strength. In this case, it follows that self-inductance of the coil C will depend on the orientation of the coil C in the magnetic field. Also, if the oscillatory current through the coil C due to the oscillations of the oscillator is kept small, in known manner, so that the incremental permeability of the core decreases with increase of the magnetic field strength, the frequency of the output from the oscillator will depend on the orientation of the coil C relative to the magnetic field in which it lies. A calibrated frequency sensitive device may then be used to indicate the orientation of the coil relative to the magnetic field.

Alternatively the coil may be arranged in a magnetic field to be measured and the calibrated frequency sensitive device will indicate the magnitude of the field.

In all the embodiments of the invention a permanent magnet may be employed to bias the field acting on the core of the coil. In this manner, a suitable mean magnetic field can be chosen about which the total field applied to the core may vary according to the variations of the external magnetic field to be measured. It is clearly desirable that the permeability of the core or the incremental permeability of the core or both should vary linearly with the variations in the external magnetic field. A suitable biassing field may be chosen from graphs similar to those shown at Figure 11 on page 15 and Figure 12 on page 16 of the publication entitled "The Magnetic Properties of the Nickel-Iron Alloys" first published by The Mond Nickel Company Limited of London, England, in February 1949.

In all embodiments of the invention the current flowing through the coil should be small so that permeability of the core should not be greatly influenced thereby.

In one embodiment a single coil of 550 turns wound in 3 layers and having a mu-metal core 2 in. in length and .018 in. in diameter had its inductance measured against variation in magnetic field. The inductance was found to vary substantially linearly over the range of 1.25 oersteds to 3 oersteds having values of 1450 microhenrys and 450 microhenrys when measured at 4 kc./s.

The invention is particularly useful when a remote reading compass is required and the arrangements shown in Figs. 2 and 3 may be used. In the sender, shown in Fig. 2 two compass coils C1 and C2 each similar to the coil C in Fig. 1 and arranged mutually at right angles are used. The coils are separately associated with two oscillators O1 and O2 which oscillate at different frequencies and are transmitted over a radio link as two subcarriers.

The coils C1 and C2 are mounted on a circular platform 1 which can be rotated continuously by means of a motor M. The platform 1 carries a projection 2 at a point on its circumference. Once per revolution of the platform 1 the projection 2 bears upon and closes a contact 3 which is carried on a ring member 4 which is in fixed relationship to the heading of the body on which the compass is carried. When the switch is closed the output of an oscillator O3 is transmitted over the radio link as a third sub-carrier.

As the platform 1 is rotated both sub-carriers are frequency modulated one by a function sin $\theta$ ($\theta$ being the angle of the axis of one coil with respect to magnetic north) and the other by a function cos $\theta$.

At the receiver, shown in Figure 3, the three subcarriers are separated by filters F1, F2 and F3 and the sub-carriers derived remotely from the oscillators O1 and O2 are fed from the filters F1 and F2 respectively to limiters and demodulators. The output from each of the demodulators which takes the form of a direct voltage which is a function of the frequency of the input to the respective demodulator is amplified and applied to the deflecting electrodes of a cathode ray tube.

The third sub-carrier frequency is passed, when present, through an amplifier, a rectifier and a D. C. amplifier to the control grid of the cathode ray tube to black out the trace.

As the remote compass coils are rotated in the earth's field the spot on the cathode ray tube will describe a circle and the position of the spot of the circumference of this circle will represent $\theta$ since the displacements of the spot in the X and Y directions of the cathode ray tube are determined by voltages proportioned to cos $\theta$ and sin $\theta$ respectively. Since the circular trace is extinguished when the contact 3 is closed, the position of the break in the circular trace in relation to its position when the craft is headed towards magnetic North shows the heading with respect to magnetic North, $\phi$, of the body on which the compass is carried.

First order errors due to mid-frequency drift and to variations in the frequency excursions of the oscillators O1 and O2 may be substantially corrected by adjusting respectively the bias on the deflector plates of the cathode ray tube and the gains of D. C. amplifiers A1 and A2 so as to correct any tendency of the cathode ray tube trace to depart from a true circle.

We claim:

1. A compass comprising two magnetically sensitive elements arranged to provide substantially sinusoidally varying electrical outputs in quadrature with one another when rotated in the earth's magnetic field, means for rotating the magnetically sensitive elements in the earth's magnetic field and means for providing, once in each revolution of the magnetically sensitive elements, a signal indicative of the angular relationship of the magnetically sensitive elements to a body external to the magnetically sensitive elements.

2. A compass as claimed in claim 1 and comprising a cathode ray tube indicator, means for applying the electrical outputs from the magnetically sensitive elements to the deflection system of the cathode ray tube indicator and for applying the said signal to a beam intensity control of the cathode ray tube indicator so as to indicate the orientation of the object with respect to the earth's magnetic field.

3. A compass comprising a first coil wound upon a core, a second and similar coil and core for the coil arranged so that the axis of the second coil lies at right angles to the axis of the first coil, biassing means for applying biassing magnetic fields to the cores so that the magnetic permeability of each of the cores varies sufficiently with the orientation of the coil in the earth's magnetic field to produce an appreciable sinusoidal variation in the inductance of the coil when the coil is rotated in the earth's magnetic field, two oscillators each having a separate one of the coils in its oscillatory circuit, means for rotating the coils about an axis at right angles to the axes of the coils so as to frequency modulate the outputs of the oscillators and means for providing once each revolution of the coils a signal indicative of the angular relationship of the coils to an object external to the coils.

4. A compass as claimed in claim 3 and comprising means for demodulating separately the outputs of the two oscillators to provide two component outputs which are functions of the frequencies of the outputs from the oscillators, a cathode ray tube indicator and means for applying the two component outputs to the deflection system of the cathode ray tube indicator and the said signal to a beam intensity control of the cathode ray tube indicator so as to indicate the orientation of the object with respect to the earth's magnetic field.

5. A compass as claimed in claim 3 and wherein the said biassing means comprises two permanent magnets associated one with each core.

6. A compass as claimed in claim 3 and wherein the oscillators are arranged to oscillate about different mean frequencies and wherein means are provided for impressing the outputs of the two oscillators, as sub-carriers, on to a single carrier frequency so as to facilitate transmission to a remote station.

7. A compass comprising two magnetically sensitive elements mounted on a common axis of rotation and arranged to provide substantially sinusoidally varying electrical outputs in quadrature with one another when rotated in the earth's magnetic field, means for rotating the magnetically sensitive elements in the earth's magnetic field and means for providing, once in each revolution of the magnetically sensitive elements, a signal indicative of the angular relationship of the magnetically sensitive elements.

References Cited in the file of this patent

UNITED STATES PATENTS

| | | |
|---|---|---|
| 1,472,342 | Pickard | Oct. 30, 1923 |
| 1,724,048 | Showalter | Aug. 13, 1929 |
| 1,984,465 | Dana | Dec. 18, 1934 |
| 1,996,906 | Delanty | Apr. 9, 1935 |
| 2,272,607 | Higonnet | Feb. 10, 1942 |
| 2,291,715 | Hepp | Aug. 4, 1942 |
| 2,370,818 | Silverman | Mar. 6, 1945 |
| 2,407,270 | Harrison | Sept. 10, 1946 |
| 2,407,536 | Chapman | Sept. 10, 1946 |

FOREIGN PATENTS

| | | |
|---|---|---|
| 865,047 | France | Feb. 10, 1941 |